July 22, 1952  J. J. PLZAK ET AL  2,604,422
METAL JOINT FOR PANELS
Filed Oct. 25, 1946
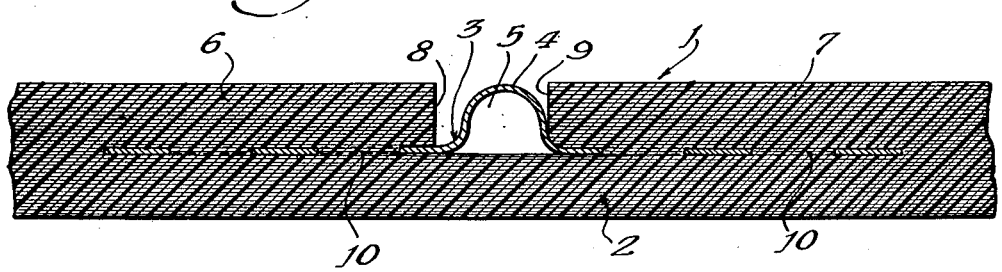
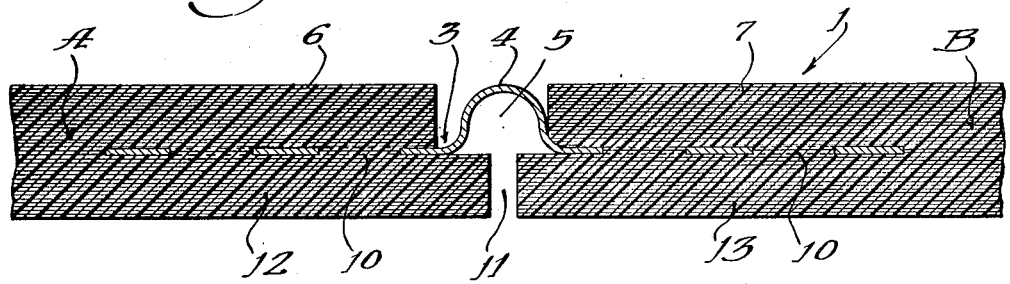
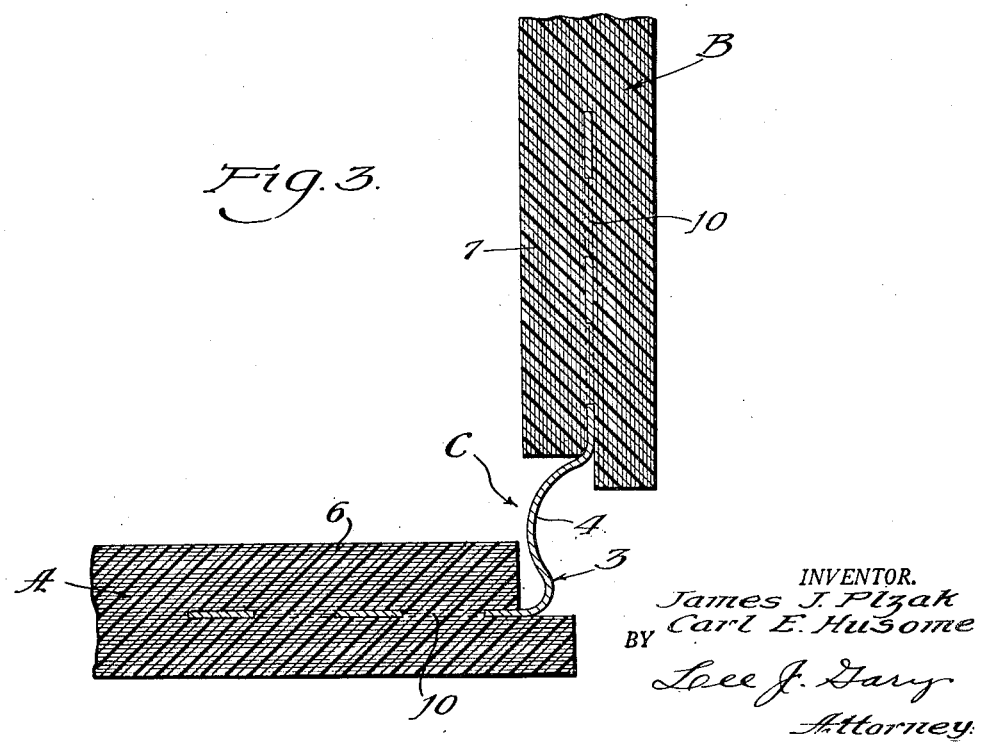
INVENTOR.
James J. Plzak
Carl E. Husome
BY Lee J. Gary
Attorney Patented July 22, 1952

2,604,422

UNITED STATES PATENT OFFICE 2,604,422

METAL JOINT FOR PANELS

James J. Plzak and Carl E. Husome, Wisconsin Rapids, Wis., assignors to Consolidated Water Power & Paper Co., Wisconsin Rapids, Wis., a corporation of Wisconsin Application October 25, 1946, Serial No. 705,566

5 Claims. (Cl. 154—45.9)

This invention relates to improvements in a sealing and connecting joint for laminated panels and a method of making the same, and refers specifically to a flexible metal joining element which is adapted to connect and seal two laminated panels at an angle to each other, the panels being originally constructed substantially unitary and in substantially coplanar relationship to each other.

In the manufacture of panels of laminated material it is frequently desirable to laminate and press the panels as substantially unitary elements in the usual flat press with a joining element embedded in the panel, the unitary panel being subsequently severed along the line of the joining element while the joining element is maintained intact so that the severed panels may be disposed, in use, at an angle to each other, the joining element comprising a sealed connection at the junction of the panels.

To accomplish this end it has been proposed to dispose a plurality of the laminae (which may comprise paper sheets saturated with resin or wood veneer bonded by glue) in face to face relation. A flexible relatively thin metal strip is then laid upon the uppermost laminae and subsequently another stack of laminae is piled upon the strip. The assemblage is then inserted in a conventional hydraulic press and the laminae are pressed and united to each other to form a laminated panel.

The panel thus formed is severed from opposite sides along the line of the metal strip by means of a rotating saw, knife or the like, but the strip is maintained intact. The panel, in use, is then bent to form two subpanels joined to each other by the strip which forms a waterproof corner connector for the two subpanels.

However, difficulty has been encountered in severing the panel after the pressing operation, without severing or injuring the joining strip embedded therein inasmuch as the depth of the strip from opposite surfaces cannot be maintained uniform. This, in turn, is due to the fact that the laminae, either paper or wood, may not be uniform in structure, one laminae being more compressible than the next, for instance, or in saturating the laminae or applying the glue, the films applied can not be controlled in thickness to the degree of uniformity necessary.

The present invention eliminates this difficulty and provides a wide degree of tolerance in the severing operation.

In addition, an ample width of joining material is provided at the joint whereby compensation may be made for discrepancies of measurements in the dimensions of the panels relative to the measurements of the base or frame upon which the panels may be used.

Briefly described, the present invention comprises forming a foundation stack of laminae as hereinbefore described and disposing the metal joining strip thereupon. However, a bead or crimp is formed longitudinally in the strip and the strip is so disposed upon the stack as to have the concave portion of the bead face downwardly. Laminae are then stacked upon the upper face of the foundation stack, but two groups of laminae are employed, the edges of each terminating adjacent the convex portion of the bead or crimp. The assembly is then inserted in a press and subsequently the foundation stack of laminae is severed, the saw or knife upon passing through the foundation thickness entering the concave portion of the bead or crimp. The depth of the bead or crimp thus provides a degree of tolerance in severing which is ample for rapid production.

Other objects and advantages of the invention will be apparent from the accompanying drawing and following detailed description.

In the drawing, Fig. 1 is a detailed sectional view of a laminated panel embodying the concepts of the invention, prior to severing.

Fig. 2 is a similar view after severing.

Fig. 3 is a similar view after bending.

Referring in detail to the drawing, 1 indicates a panel embodying the concepts of the invention, the panel being constructed essentially of a plurality of adhesively bonded and compressed laminae.

It is to be understood that the concepts of the present invention contemplate any type of laminated structure and it is not intended that the invention be limited to the type of lamina employed whether, paper, fabric, wood, metal, plastic or the like, nor is the invention intended to be limited to the type of adhesive or bonding agent employed whether, thermoplastic, thermosetting, glue or the like.

In one embodiment of the present invention a web of paper is continuously saturated with a thermosetting resin, the web being subsequently cut into sheets of desired size which may constitute the lamina of the structure 1. For purposes of illustration this type of construction will be herein described wherein 2 indicates a foundation stack of one or more laminae or sheets which have been saturated with resin. In the formation of the structure 1 a metal member 3 is positioned upon the stack 2, said metal member being coextensive in length with the length of the stack 2. The member 3 intermediate its width is provided with a crimp or bead 4 and is so positioned upon the foundation stack 2 as to be concave downwardly, providing a space 5 between the concave face of the bead and the upper surface of the stack 2.

Two upper stacks 6 and 7 of laminae or sheets are positioned upon the upper surface of the stack 2 with edge 8 spaced a relative short distance from the convex portion of the bead 4 and the edge 9 disposed adjacent said convex portion on the opposite side thereof. The stacks 6 and 7 confine those portions of strip 3 on opposite sides of bead 4 between the respective stacks and stack 2. The assembly is then subjected to pressure to consolidate the whole into a unitary structure 1.

In the case herein illustrated where the stacks 2, 6 and 7 comprise sheets saturated with a thermosetting resin, the press platens may be heated above the curing temperature of the resin whereby the stacks are bonded together in compressed cured condition.

To facilitate the bonding of the strip 3 within the body of the structure 1, said strip is provided with a plurality of keying openings 10 whereby the pressure exerted upon the stacks causes stacks 6 and 7 to be keyed to the stack 2 through said openings thereby preventing the possibility of movement of the strip parallel to the faces of the laminae comprising the consolidated stacks.

In view of the fact that the compression does not depress the upper surfaces of the stacks 6 and 7 below the upper portion of the bead 4, the space 5 remains within the bead after the structure has been consolidated and cured.

Subsequent to the pressing of the structure 1, the foundation stack is severed, the cutting operation being carried out from the outer face of the foundation stack along the centerline of the bead 4, as shown best at 11 in Fig. 2. It can readily be seen that the cutting tool, knife or saw can be made to readily sever the thickness of the foundation stack 2 without injuring the strip 3 inasmuch as tolerance, to the extent of the depth of space 5, is provided. By severing the foundation stack 2 into two portions 12 and 13, two distinct panels A and B are formed, being joined along their adjacent edges by the material constituting bead 4.

A structure such as hereinbefore described comprising panels A and B joined by the material constituting bead 4 finds use, for example, in the lining of automotive truck bodies wherein the panel A may comprise the floor and panel B may comprise a portion of one of the sides of the truck body. In this use of the invention the panels are disposed at an angle to each other as illustrated in Fig. 3 and are joined to the truck frame (not shown) which outlines the floor and sides of the body. Thus a sealed, leakproof corner C is provided by the material constituting the bead 4. Such construction is most desirable in trucks which carry foodstuffs, ice or other commodity which may contain liquid or moisture.

As another feature of the present invention the bead 4 provides, when the panels are disposed at an angle to each other, a degree of tolerance which may assist in conforming the panels A and B to the dimensions of the frame upon which they are to lie and be carried. In addition, the member 4 provides a degree of flexibility to the joint which tends to absorb vibration and distortion and, hence, prevents premature fatigue of the metal constituting the joint.

It is to be understood that the use of the invention upon truck bodies, as hereinbefore described, is merely set forth for purposes of illustration, since occasions where sealing, leakproof joints comprising the invention are utilizable are numerous. Hence, it is not intended that the invention be limited to this specific use. In addition, in constructing the structure 1 the foundation stack 2 and stacks 6 and 7 may each comprise unitary lamina and need not be a built up stack of relatively thin sheets or layers.

We claim as our invention:

1. An intermediate product comprising a unitary foundation layer and two superimposed layers each bonded to said foundation layer in face to face relationship, said superimposed layers having adjacent edges spaced from each other, a bendable metal member embedded between said foundation layer and said superimposed layers, said metal member carrying a bead positioned between the adjacent edges of said superimposed layers and disposed concave downwardly with respect to said foundation layer to provide a space between the bead and the foundation layer, into which a severing instrument is adapted to protrude when the foundation layer is severed adjacent the center line of the bead to form two panels connected by said metal member.

2. An intermediate product comprising a unitary foundation layer and two superimposed layers each bonded to said foundation layer in face to face relationship, said superimposed layers having adjacent edges spaced from each other, a bendable metal member embedded between said foundation layer and said superimposed layers, said metal member carrying a bead disposed concave downwardly with respect to said foundation layer to provide a space between the bead and the foundation layer, said bead being disposed between the adjacent edges of said superimposed layers and being substantially coextensive with said edges, said foundation layer being adapted to be severed along a line parallel to the longitudinal center line of said bead to form two panels connected by said metal member.

3. An intermediate product comprising a continuous foundation layer and two superimposed layers each bonded to said foundation layer by pressure in face to face relationship, said superimposed layers having adjacent edges spaced from each other along a transverse line intermediate the length of said foundation layer, a bendable metal member embedded between said foundation layer and said superimposed layers, said metal member carrying a bead disposed concave downwardly with respect to said foundation layer to provide a space between the bead and the foundation layer, said bead being disposed between the adjacent edges of said superimposed layers, and of a depth not greater than the thickness of said superimposed layers, said foundation layer being adapted to be severed along a line parallel to the longitudinal center line of said bead to form two panels connected by said metal member.

4. An intermediate product comprising a continuous foundation layer and two superimposed layers each bonded to said foundation layer in face to face relationship, said layers comprising a plurality of laminae bonded together, said superimposed layers having adjacent edges spaced from each other along a transverse line intermediate the length of said foundation layer, a bendable metal member embedded between said foundation layer and said superimposed layers, said metal member carrying a bead disposed concave downwardly with respect to said foundation layer to provide a space between the bead and the foundation layer, said bead being disposed between the adjacent edges of said superimposed layers, said foundation layer being adapted to be severed along a line parallel to the longitudinal center line of said bead to form two sub-panels connected by said metal member, the severing instrument being adapted to protrude into the space provided by said bead.

5. An intermediate product comprising a continuous foundation layer and two superimposed layers each including resin-saturated fibrous sheets bonded together and cured, each of said superimposed layers being bonded to said foundation layer in face to face relationship and cured in bonded position, said superimposed layers having adjacent edges spaced from each other along a transverse line intermediate the length of said foundation layer, a bendable metal member embedded between said foundation layer and said superimposed layers, said metal member carrying a bead disposed concave downwardly with respect to said foundation layer to provide a space between the bead and the foundation layer, said bead being not greater in depth than the thickness of said superimposed layers, and said bead being disposed between the adjacent edges of said superimposed layers.

JAMES J. PLZAK.
CARL E. HUSOME.

REFERENCES CITED

The following references are of record in the file of this patent:

UNITED STATES PATENTS

| Number | Name | Date |
|---|---|---|
| 1,365,335 | Miles | Jan. 11, 1921 |
| 1,377,671 | Dieckmann | May 10, 1921 |
| 1,931,524 | Becket | Oct. 24, 1933 |